United States Patent
Tsai et al.

(10) Patent No.: US 9,262,358 B2
(45) Date of Patent: Feb. 16, 2016

(54) EXPRESSCARD ADAPTER AND ELECTRONIC DEVICE

(71) Applicant: ShenZhen Goldsun Network Intelligence Technology Co., Ltd., ShenZhen (CN)

(72) Inventors: Meng-Lin Tsai, New Taipei (TW); Hsien-Chuan Liang, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 313 days.

(21) Appl. No.: 13/974,070

(22) Filed: Aug. 23, 2013

(65) Prior Publication Data

US 2014/0173159 A1    Jun. 19, 2014

(30) Foreign Application Priority Data

Dec. 13, 2012  (TW) .............................. 101147294 A

(51) Int. Cl.
*G06F 13/00* (2006.01)
*G06F 13/40* (2006.01)
*G06F 5/00* (2006.01)

(52) U.S. Cl.
CPC ...................................... *G06F 13/40* (2013.01)

(58) Field of Classification Search
CPC .................................. G06F 13/00; G06F 5/00
USPC ................. 710/300, 313, 315, 2, 65
See application file for complete search history.

(56) References Cited

U.S. PATENT DOCUMENTS

| | | | | |
|---|---|---|---|---|
| 7,447,825 B2* | 11/2008 | Chen | .................... | G06F 13/4081 710/301 |
| 7,660,938 B1* | 2/2010 | Chow | .................... | G06F 13/4045 710/313 |
| 7,673,092 B2* | 3/2010 | Zhao | .................... | G06F 13/409 439/291 |
| 7,779,184 B2* | 8/2010 | Hubert | .................... | G06F 13/1684 710/38 |
| 7,921,233 B2* | 4/2011 | Chung | .................... | G06F 13/387 439/638 |
| 8,051,229 B2* | 11/2011 | Hubert | .................... | G06F 13/409 710/74 |
| 8,180,931 B2* | 5/2012 | Lee | .................... | G06F 3/0613 710/14 |
| 2009/0006681 A1* | 1/2009 | Hubert | .................... | G06F 13/409 710/74 |
| 2009/0006707 A1* | 1/2009 | Hubert | .................... | G06F 13/1684 710/313 |
| 2009/0077295 A1* | 3/2009 | Konno | .................... | G06F 13/4068 710/301 |
| 2009/0271557 A1* | 10/2009 | Hsu | .................... | G06F 13/4027 710/315 |
| 2010/0125692 A1* | 5/2010 | Lai | .................... | G06F 13/409 710/302 |
| 2010/0174835 A1* | 7/2010 | Chung | .................... | G06F 13/387 710/15 |
| 2011/0271029 A1* | 11/2011 | Ho | .................... | G06F 13/385 710/313 |
| 2012/0185636 A1* | 7/2012 | Leon | .................... | H01L 23/576 711/102 |
| 2012/0265919 A1* | 10/2012 | Jono | .................... | G06F 13/40 710/316 |
| 2012/0290757 A1* | 11/2012 | Cheng | .................... | G06F 1/305 710/301 |
| 2014/0019661 A1* | 1/2014 | Hormuth | .................... | G06F 15/17331 710/306 |
| 2014/0250247 A1* | 9/2014 | Yang | .................... | G06F 13/385 710/74 |
| 2015/0212961 A1* | 7/2015 | Wu | .................... | G06F 13/385 710/313 |

* cited by examiner

*Primary Examiner* — Christopher Shin

(74) *Attorney, Agent, or Firm* — Novak Druce Connolly Bove + Quigg LLP

(57) ABSTRACT

An ExpressCard adapter able to accept a PCI-E-type or a USB-type ExpressCard in a single ExpressCard slot includes the ExpressCard slot, a PCI-E port, a data conversion unit, a switch unit, and a detection unit. The data conversion unit is connected to the PCI-E port, and converts between USB data and PCI-E data. The switch unit connects the ExpressCard slot to the PCI-E port or to the data conversion unit. The detection unit detects the type of ExpressCard which is inserted and controls the switch unit to connect the ExpressCard slot either to the PCI-E port or to the data conversion unit as required.

11 Claims, 2 Drawing Sheets

EXPRESSCARD ADAPTER AND ELECTRONIC DEVICE

BACKGROUND

1. Technical Field

The present disclosure relates to adapters, particularly, to an ExpressCard and an electronic device.

2. Description of Related Art

Many electronic devices, such as computers, have a number of different peripheral component interconnect (PCI) slots, such as a PCI slot and a PCI-E (PCI Express) slot. ExpressCards based on the PCI are used because of they have quicker speed and smaller size. Usually, ExpressCards include two types, one type of the ExpressCard includes PCI-E port, and another type of ExpressCard includes (universal serial bus) USB port. When an electronic device includes different types of ExpressCards, ExpressCards including the PCI-E port need to be connected to the PCI slot of an electronic device, and the ExpressCards including the USB port need to be connected to the USB port of the electronic device. Thus different data lines for the electronic device need to be installed. Using different types of data lines is not convenient for the user.

An ExpressCard and an electronic device to overcome the described limitations are thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
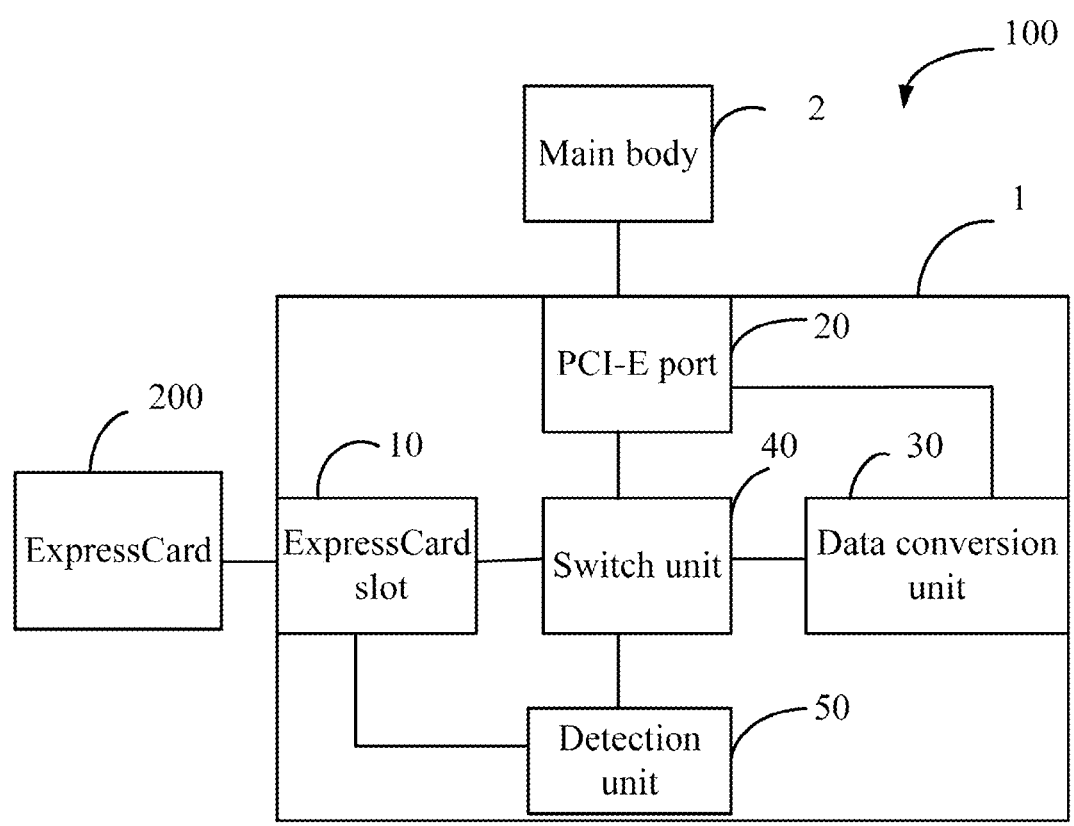
FIG. 1 is a block diagram of an electronic device with an ExpressCard adapter in accordance with an exemplary embodiment.

FIG. 1 illustrates an electronic device with an ExpressCard adapter. The electronic device 100 includes an ExpressCard adapter 1 and a main body 2. The ExpressCard adapter 1 includes an ExpressCard slot 10, a peripheral component interconnect express (PCI-E) port 20, a data conversion unit 30, a switch unit 40, and a detection unit 50.

The PCI-E port 20 is used to connect to the main body 2. The ExpressCard slot 10 is used to connect to an ExpressCard 200. The ExpressCard 200 can include a USB port or a PCI-E port.

The data conversion unit 30 is connected to the PCI-E port 20, and is used to convert data of USB format to data of PCI-E format, or convert data of PCI-E format to data of USB format.

The switch unit 40 is connected between the PCI-E slot 10, the PCI-E port 20, and the data conversion unit 30, and is used to connect the PCI-E slot 10 with the PCI-E port, or to switch the PCI-E slot 10 to connect with the data conversion unit 30.

The detection unit 50 is connected to the PCI-E slot 10 and the switch control 40, and is used to detect a type of the ExpressCard 200 connected to the PCI-E slot 10. The detection unit 50 also controls the switch unit 40 to establish a connection between the PCI-E slot 10 and the PCI-E port 20 when it is detected that the ExpressCard 200 includes the PCI-E port, namely, that the ExpressCard 200 is the type of ExpressCard 200 with the PCI-E port. Thus, the ExpressCard 200 including the PCI-E port can communicate with the main body 2 via the PCI-E slot 10 and the PCI-E port 20.

The detection unit 50 also controls the switch unit 40 to establish a connection between the PCI-E slot 10 and the data conversion unit 20 when it is detected that the ExpressCard 200 includes the USB port, namely, that the ExpressCard 200 is the type of ExpressCard 200 with the USB port. The data conversion unit 30 executes data conversions between USB format data and PCI-E format data. Thus, the ExpressCard 200 can communicate with the main body 2 via the PCI-E slot 10, the data conversion unit 30, and the
PCI-E port 20.

Figure 2:
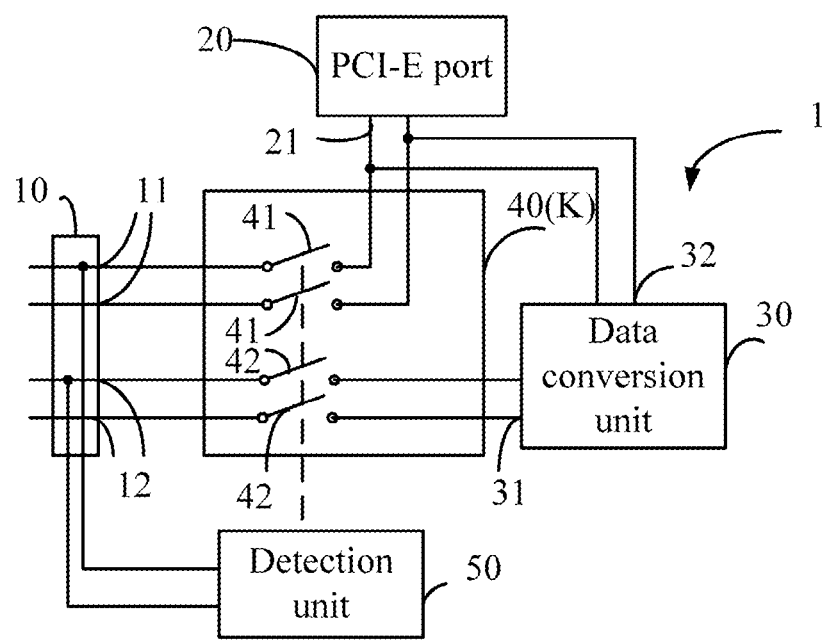
FIG. 2 is a circuit diagram of an ExpressCard adapter in accordance with an exemplary embodiment.

Referring to FIG. 2, in the embodiment, the PCI-E slot 10 includes a group of USB pins 11 and a group of PCI-E pins 12. The detection unit 50 detects the type of the ExpressCard 200 connected to the PCI-E slot 10 according to which pins of the PCI-E slot 10 have been connected to by the ExpressCard 200. In detail, the detection unit 50 detects that the type of the ExpressCard 200 connected to the PCI-E slot 10 is the type of the ExpressCard with the USB port when detecting the USB pins of the PCI-E slot 10 are connected to by the ExpressCard 200. The detection unit 50 detects that the type of the ExpressCard 200 connected to the PCI-E slot 10 is the type of the ExpressCard with the PCI-E port when detecting that the PCI-E pins of the PCI-E slot 10 are connected to by the ExpressCard 200.

As shown in FIG. 2, the PCI-E port 20 includes a number of PCI-E pins 21, the data conversion unit 30 includes a number of USB pins 31 and a number of PCI-E pins 32. The number of the PCI-E pins 32 of the data conversion unit 30 are connected to the number of PCI-E pins 21 of the PCI-E port 20.

In the embodiment, the switch unit 40 is a multi-connection switch K, the multi-connection switch K includes a number of first channel switches 41 and a number of second channel switches 42. The first channel switches 41 are connected between the PCI-E pins 21 of the PCI-E slot 10 and the PCI-E pins 21 of the PCI-E port 20. The second channel switches 41 are connected between the USB pins 22 of the PCI-E slot 10 and the USB pins 31 of the data conversion unit 30.

When the detection unit 50 detects that the type of the ExpressCard 200 connected to the PCI-E slot 10 is the ExpressCard 200 including the PCI-E port, the detection unit 50 turns on all of the first channel switches 41 and turns off all of the second channel switches 41. Thus, a connection between the PCI-E slot 10 and the PCI-E port 20 is established, and a connection between the PCI-E slot 10 and the data conversion unit 30 is cut off.

When the detection unit 50 detects that the type of the ExpressCard 200 connected to the PCI-E slot 10 is the ExpressCard 200 including the USB port, the detection unit 50 turns on all of the second channel switches 41 and turns off all of the first channel switches 41. Thus, any connection between the PCI-E slot 10 and the PCI-E port 20 is cut off, and a connection between the PCI-E slot 10 and the data conversion unit 30 is established.

In another embodiment, the switch unit 40 includes a number of single-pole double-throw (SPDT) switches (not shown), common terminals of the SPDT switches are connected to the pins of the PCI-E slot 10, normally closed terminals of the SPDT switches are connected to the PCI-E pins 21 of the PCI-E port 20, and normally open terminals of the SPDT switches are connected to the USB pins 31 of the data conversion unit 30. The switch unit 40 controls the SPDT switches to connect the common terminals of the SPDT switches to the PCI-E pins 21 of the PCI-E port 20 or may control the SPDT switches to connect the common terminals of the SPDT switches to the PCI-E pins 21 of the PCI-E port 20. A connection between the PCI-E slot 10 and the PCI-E port 20, or between the PCI-E port 10 and the data conversion unit 30 is thus established.

In the embodiment, whether the ExpressCard 200 includes the USB port or the PCI-E port, the ExpressCard 200 can connect to the ExpressCard adapter 1 and then connect to the electronic device 100 directly, thus different data lines are not required.

In the embodiment, the PCI-E port 10 of the ExpressCard adapter 1 also can connect to a device (not shown) via a data line (not shown) with the USB port or PCI-E port.

In the embodiment, the electronic device 100 can be a computer, such as a tablet computer, a portable computer, and a desktop computer, or can be a mobile phone, a digital photo frame, a digital camera, or the like.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An ExpressCard adapter comprising:
   an ExpressCard slot, configured to connect to an ExpressCard;
   a peripheral component interconnect express (PCI-E) port;
   a data conversion unit connected to the PCI-E port, wherein the data conversion unit is configured to convert data of USB format to data of PCI-E format, or vice versa;
   a switch unit connected among the PCI-E slot, the PCI-E port, and the data conversion unit, wherein the switch unit is configured to connect the PCI-E slot with the PCI-E port, or switch the PCI-E slot to connect with the data conversion unit; and
   a detection unit connected to the PCI-E slot and the switch unit, wherein the detection unit is configured to detect a type of the ExpressCard connected to the PCI-E slot, and control the switch unit to establish connection between the PCI-E slot and the PCI-E port when detecting that the ExpressCard is a type of ExpressCard with a PCI-E port, and control the switch unit to establish connection between the PCI-E slot and the data conversion unit when detecting that the ExpressCard is a type of ExpressCard with a universal serial bus (USB) port.

2. The ExpressCard adapter according to claim 1, wherein the PCI-E slot comprises a group of USB pins and a group of PCI-E pins; the detection unit detects the type of the ExpressCard connected to the PCI-E slot according to which pins of the PCI-E slot have been connected by the ExpressCard.

3. The ExpressCard adapter according to claim 2, wherein the PCI-E port comprises a plurality of PCI-E pins, the data conversion unit comprises a plurality of USB pins and a number of PCI-E pins, the PCI-E pins of the data conversion unit are respectively connected to the PCI-E pins of the PCI-E port.

4. The ExpressCard adapter according to claim 3, wherein the switch unit comprises a plurality of first channel switches and a plurality of second channel switches, the first channel switches are respectively connected between the PCI-E pins of the PCI-E slot and the PCI-E pins of the PCI-E port; and the second channel switches are respectively connected between the USB pins of the PCI-E slot and the USB pins of the data conversion unit.

5. The ExpressCard adapter according to claim 4, wherein when the detection unit detects the type of the ExpressCard connected to the PCI-E slot is the ExpressCard with the PCI-E port, the detection unit turns on all of the first channel switches and turns off all of the second channel switches; when the detection unit detects the type of the ExpressCard connected to the PCI-E slot is the ExpressCard with the USB port, the detection unit turns on all of the second channel switches and turns off all of the first channel switches.

6. An electronic device comprising:
   a main body; and
   an ExpressCard adapter comprising:
   a ExpressCard slot, configured to connect to an ExpressCard;
   a peripheral component interconnect express (PCI-E) port connected to the main body;
   a data conversion unit connected to the PCI-E port, wherein the data conversion unit is configured to convert data of USB format to data of PCI-E format, or vice versa;
   a switch unit connected among the PCI-E slot, the PCI-E port, and the data conversion unit, wherein the switch unit is configured to connect the PCI-E slot with the PCI-E port, or switch the PCI-E slot to connect with the data conversion unit; and
   a detection unit connected to the PCI-E slot and the switch control, wherein the detection unit is configured to detect a type of the ExpressCard connected to the PCI-E slot, and control the switch unit to establish connection between the PCI-E slot and the PCI-E port when detecting that the ExpressCard is a type of ExpressCard with a PCI-E port, and control the switch unit to establish connection between the PCI-E slot and the data conversion unit when detecting that the ExpressCard is a type of ExpressCard with a universal serial bus (USB) port.

7. The electronic device according to claim 6, wherein the PCI-E slot comprises a group of USB pins and a group of PCI-E pins; the detection unit detects the type of the ExpressCard connected to the PCI-E slot according to which pins of the PCI-E slot have been connected by the ExpressCard.

8. The electronic device according to claim 7, wherein the PCI-E port comprises a plurality of PCI-E pins, the data conversion unit comprises a plurality of USB pins and a number of PCI-E pins, the PCI-E pins of the data conversion unit are respectively connected to the PCI-E pins of the PCI-E port.

9. The electronic device according to claim 8, wherein the switch unit comprises a plurality of a first channel switches and a plurality of second channel switches, the first channel switches are respectively connected between the PCI-E pins of the PCI-E slot and the PCI-E pins of the PCI-E port; and the second channel switches are respectively connected between the USB pins of the PCI-E slot and the USB pins of the data conversion unit.

10. The electronic device according to claim 9, wherein when the detection unit detects the type of the ExpressCard connected to the PCI-E slot is the ExpressCard with the PCI-E port, the detection unit turns on all of the first channel switches and turns off all of the second channel switches; when the detection unit detects the type of the ExpressCard connected to the PCI-E slot is the ExpressCard with the USB port, the detection unit turns on all of the second channel switches and turns off all of the first channel switches.

11. The electronic device according to claim 6, wherein the electronic device is a computer, a digital photo frame, a mobile phone, or an digital camera.

\* \* \* \* \*